(12) United States Patent
Lee

(10) Patent No.: US 7,163,299 B2
(45) Date of Patent: Jan. 16, 2007

(54) ILLUMINATION UNIT AND PROJECTION IMAGE DISPLAY HAVING THE SAME

(75) Inventor: Young-chol Lee, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 48 days.

(21) Appl. No.: 10/825,675

(22) Filed: Apr. 16, 2004

(65) Prior Publication Data

US 2005/0007554 A1    Jan. 13, 2005

(30) Foreign Application Priority Data

Jul. 8, 2003    (KR)    .................... 10-2003-0046125

(51) Int. Cl.
```
G03B 21/28     (2006.01)
G03B 21/14     (2006.01)
G02B 6/00      (2006.01)
F21V 7/00      (2006.01)
H04N 5/74      (2006.01)
```
(52) U.S. Cl. ............................. 353/99; 353/37; 353/97; 353/102; 362/341; 362/551; 385/34; 348/759

(58) Field of Classification Search .................. 353/99, 353/98, 31, 30, 37, 20, 102, 97; 385/34, 385/133, 901; 362/327, 551, 341; 349/5, 349/8, 9, 96; 348/759
See application file for complete search history.

(56) References Cited

U.S. PATENT DOCUMENTS

| | | | |
|---|---|---|---|
| 6,205,271 B1 | 3/2001 | Bowron et al. | |
| 6,288,815 B1 | 9/2001 | Lambert | |
| 6,577,380 B1 | 6/2003 | Sposili et al. | |
| 2001/0008470 A1 | 7/2001 | Dewald | |
| 2002/0191154 A1 | 12/2002 | Shahzad et al. | |
| 2003/0086066 A1* | 5/2003 | Kato ........................... | 353/20 |

FOREIGN PATENT DOCUMENTS

| | | |
|---|---|---|
| JP | 7-281293 A | 10/1995 |
| JP | 11-281-930 A | 10/1999 |
| KR | 1999-002347 A | 1/1999 |
| KR | 2001-0091705 A | 10/2001 |

\* cited by examiner

Primary Examiner—W. B. Perkey
Assistant Examiner—Rochelle Blackman
(74) Attorney, Agent, or Firm—Sughrue Mion, PLLC

(57) ABSTRACT

An illumination unit for a projection image display. The illumination unit includes a light source, an integrator which converts light emitted from the light source to have uniform optical intensity, and an aspect ratio conversion unit which transmits light emitted from the integrator that does not correspond to an aspect ratio of image information back to the integrator, and converts and emits incident light to correspond to the aspect ratio of the image information.

18 Claims, 11 Drawing Sheets

TOTAL FLUX= 3126 Lumen

TOTAL FLUX= 2046 Lumen

TOTAL FLUX= 2005 Lumen

TOTAL FLUX= 1658 Lumen

ILLUMINATION UNIT AND PROJECTION IMAGE DISPLAY HAVING THE SAME

BACKGROUND OF THE INVENTION

This application claims the priority of Korean Patent Application No. 2003-46125, filed on Jul. 8, 2003, in the Korean Intellectual Property Office, the disclosure of which is incorporated herein in its entirety by reference.

1. Field of the Invention

An apparatus consistent with the present invention relates to a projection image display that enlarges and projects an image to be displayed and, more particularly, to a projection image display that projects image information at a variety of aspect ratios.

2. Description of the Related Art

Projection image displays are devices which modulate light emitted from an illumination unit using an optical modulator, such as a liquid crystal display panel and a digital micromirror device, to correspond to image information and enlarges and projects the image information onto a screen.

The projection image displays need to display image information having a variety of aspect ratios, such as common image information having an aspect ratio of 4:3, high definition (HD) image information having an aspect ratio of 16:9, and wide image information having an aspect ratio of 2.35:1. In general, an optical modulator has an aspect ratio of 4:3. In order to display image information having a variety of aspect ratios, a method of masking unused pixels of the optical modulator may be needed. FIGS. 1A–1C show examples in which common image information, HD image information and wide image information are displayed using an optical modulator 1 having an aspect ratio of 4:3. When the image information has an aspect ratio of 4:3, a total region T of the optical modulator 1 is used as an optical modulation region. When HD image information is displayed, only a region H, which is defined to have the aspect ratio of 16:9, is used as the optical modulation region. Similarly, when wide image information is displayed, only a region W, which is defined to have the aspect ratio of 2.35:1, is used as the optical modulation region. In the HD and wide image information cases, pixels in the unused portions of an optical modulation region are turned "off." For example, in a transmission optical modulator, the pixels in the unused portion are turned "off" so that light does not pass though.

The conventional projection image displays project image information having a variety of aspect ratios using the above-described method. However, the above-described method is not preferable with respect to optical efficiency because the conventional illumination unit is designed to radiate illumination light on the total region T of the optical modulator 1 based on image information having an aspect ratio of 4:3. However, when HD image information is displayed, incident light on a region other than the region H is not used effectively and is wasted. Optical efficiency in this case is lower than the optical efficiency that may occur when image information having an aspect ratio of 4:3 is displayed. This lower optical efficiency also applies to a case where wide image information is displayed.

SUMMARY OF THE INVENTION

An apparatus consistent with the present invention provides an illumination unit for a projection image display having an improved structure in which an aspect ratio of light irradiated on an optical modulator is adjusted according to the aspect ratio of the image information, and a projection image display having the illumination unit.

According to one aspect of the present invention, there is provided an illumination unit for a projection image display, the illumination unit comprising a light source; an integrator, which converts light emitted from the light source to have uniform optical intensity; and an aspect ratio conversion unit, which transmits light emitted from the integrator that does not correspond to an aspect ratio of image information back to the integrator, and converts and emits incident light to correspond to the aspect ratio of the image information.

According to another aspect of the present invention, there is provided a projection image display comprising an illumination unit, an optical modulator which modulates light emitted from the illumination unit according to image data, and a projection optical system which enlarges and projects light emitted from the optical modulator, wherein the illumination unit comprises a light source; an integrator, which converts light emitted from the light source to have uniform optical intensity; and an aspect ratio conversion unit, which transmits light emitted from the integrator that does not correspond to an aspect ratio of image information back to the integrator, and converts and emits incident light to correspond to the aspect ratio of the image information.

The aspect ratio conversion unit may comprise a slit member, which may be installed on a side of the integrator on which light is emitted, adjusts an aspect ratio of a cross-section of the integrator on which light is emitted according to the aspect ratio of the image information and reflects light, which does not correspond to the aspect ratio of the image information, back to the integrator; a recycling member, which is provided on a side of the integrator on which light is incident and is a reflective body which reflects light that has been reflected back to the integrator from the slit member, and in which a light window is formed so that light emitted from the light source is incident on the integrator; and a driving unit, which drives the slit member.

BRIEF DESCRIPTION OF THE DRAWINGS

The above and other aspects and advantages of the present invention will be readily apparent by describing, in detail, exemplary embodiments thereof with reference to the accompanying drawings, in which.

DETAILED DESCRIPTION OF THE INVENTION

An apparatus consistent with the present invention will be described more fully with reference to the accompanying drawings.

Figure 2:
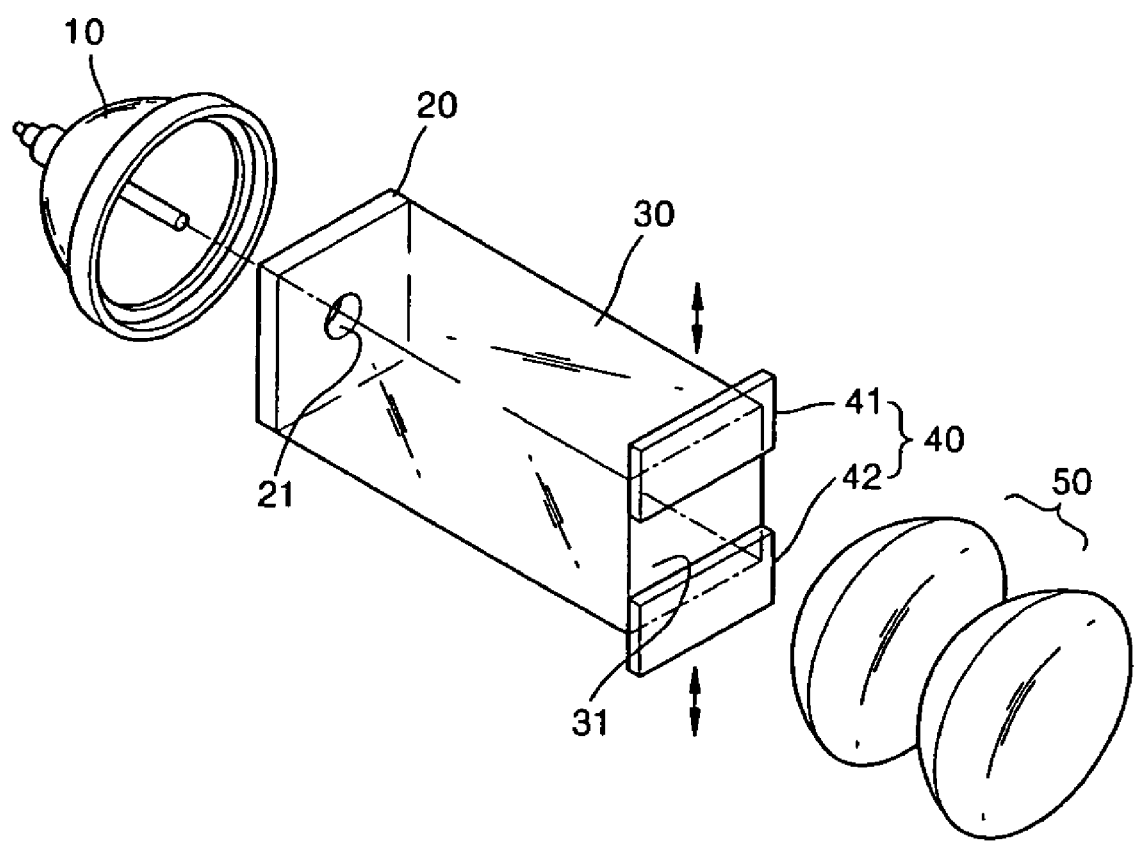
FIG. 2 is a perspective view illustrating an illumination unit for a projection image display according to an embodiment of the present invention.

FIG. 2 is a perspective view illustrating an illumination unit for a projection image display according to an embodiment of the present invention. The projection image display comprises a light source 10, an integrator 30, and a relay lens 50, which guides light emitted from the integrator 30 to an optical modulator (not shown).

The light source 10, which may be a metal halide lamp or an LED, emits white light or one of red light, green light, and blue light. When the light source 10 emits the white light, the white light may be filtered by a color filter (not shown) before being transmitted to the optical modulator so that the white light is a monochromatic light having one color of red, green, and blue. Preferably, but not necessarily, the color filter is provided between the light source 10 and the integrator 30.

Figure 3:
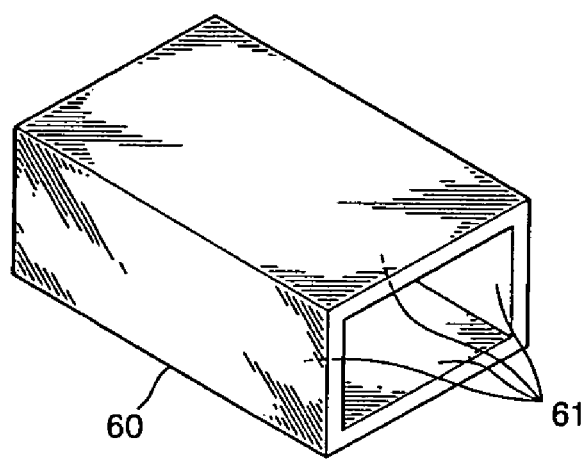
FIG. 3 is a perspective view illustrating an integrator according to another embodiment of the present invention.

The integrator 30 converts and emits light transmitted from the light source 10 to have uniform optical intensity. As shown in FIG. 2, a transparent rod, such as a glass rod, may be used as the integrator 30. In addition, as shown in FIG. 3, a hollow-shaped light tunnel 60 having internal reflective surfaces 61 may be used as the integrator 30. Preferably, but not necessarily, the integrator 30 has a rectangular cross-section perpendicular to a progressive direction of light.

The illumination unit includes an aspect ratio conversion unit which converts the aspect ratio of light emitted from the integrator 30 in accordance with the aspect ratio of image information. The aspect ratio conversion unit includes a slit member 40, a recycling member 20, and a driving unit for driving the slit member 40.

The slit member 40 may be included on the side of the integrator 30 on which light is emitted. The slit member 40 adjusts the aspect ratio of a cross-section 31 of the integrator 30 on which light is emitted according to the aspect ratio of image information. The slit member 40 reflects Sight, emitted from the integrator 30, which does not correspond to the aspect ratio of image information, back to the integrator 30.

Figure 4:
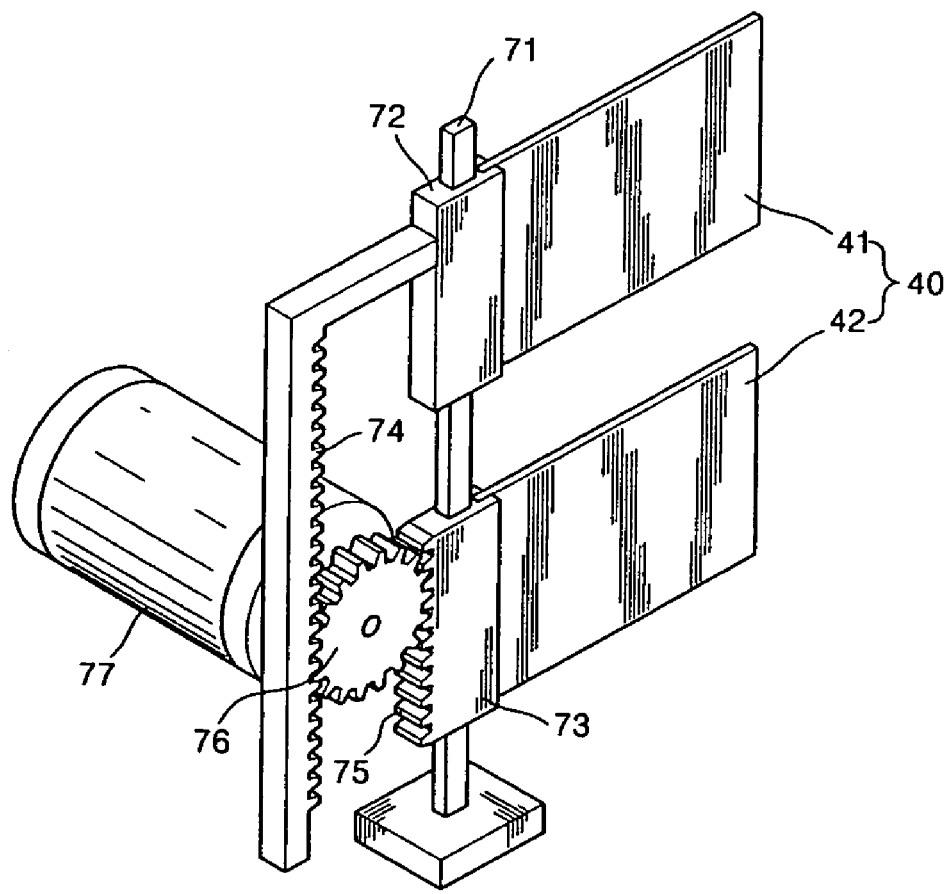
FIG. 4 is a perspective view illustrating a driving unit for driving a slit member according to the present invention.

The slit member 40 may comprises a pair of reflective mirrors 41 and 42, which are used to adjust the aspect ratio of the cross-section 31. FIG. 4 is a perspective view illustrating a non-limiting example of a driving unit for driving a slit member that is consistent with the present invention. The scope of the present invention is not limited to this example. A guide member 71 may be installed in a lengthwise direction as shown in FIG. 4 (or other orientations, not shown). First and second holders 72 and 73 which attach to the reflective mirrors 41 and 42, respectively, are combined with the guide member 71 so that the first and second holders 72 and 73 slide on the guide member 71. The first and second holders 72 and 73 comprise rack gears 74 and 75, respectively, which are placed facing each other, and a pinion 76 is placed therebetween. A driving motor 77 drives the pinion 76. In this structure, the pinion 76 may be rotated in both directions causing the reflective mirrors 41 and 42 to be adjacent or spaced apart from each other, thus, adjusting the aspect ratio of the cross-section 31. The slit member 40 may include only one of the reflective mirrors 41 and 42. In this case, the driving unit includes only one of the first holder 72 and the second holder 73.

The recycling member 20 is installed on a side of the integrator 30 on which light is incident. The recycling member 20 is a reflective body that reflects light, which has been reflected back to the integrator 30 using the slit member 40, such that the light progresses onto the cross-section 31. A light window 21 is provided in the recycling member 20 so that light emitted from the light source 10 is incident on the integrator 30.

Figure 5:
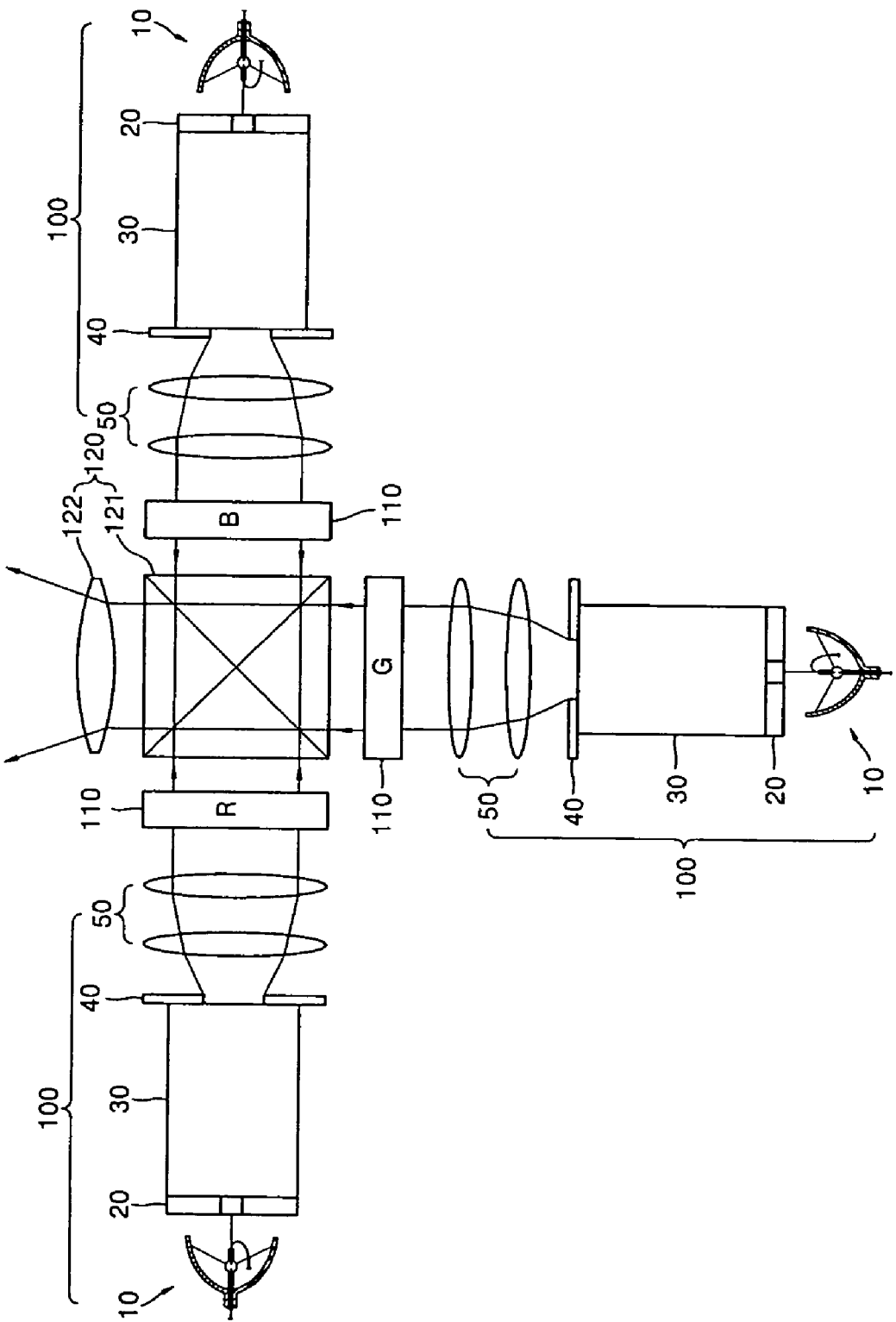
FIG. 5 illustrates a structure of a projection image display having the illumination unit according to an embodiment of the present invention.

FIG. 5 illustrates a structure of a projection image display having the illumination unit according to an embodiment of the present invention. An optical modulator can be classified as a transmission optical modulator or a reflection optical modulator. The projection image display in FIG. 5 is a projection image display comprising a transmission optical modulator.

The projection image display comprises a liquid crystal display panel 110, which is used as the transmission optical modulator, an illumination unit 100, which illuminates the liquid crystal display panel 110, and a projection optical system 120, which enlarges and projects light modulated by the liquid crystal display panel 110. The projection image display may comprise three liquid crystal display panels 110R, 110G, and 110B which modulate red light, green light, and blue light, respectively. The projection optical system comprises a color synthesis prism 121 which synthesizes a three-color light modulated by the respective liquid crystal display panels 110R, 110G, and 110B and a projection lens 122, which enlarges and projects the synthesized light. The liquid crystal display panel 110 used in the projection image display may be a small liquid crystal display panel having the width and height of about 1 inch. The illumination unit 100 is used to illuminate the liquid crystal display panel 110, and one illumination unit 100 is provided for each of the liquid crystal display panels 110R, 110G, and 110B.

Figure 6:
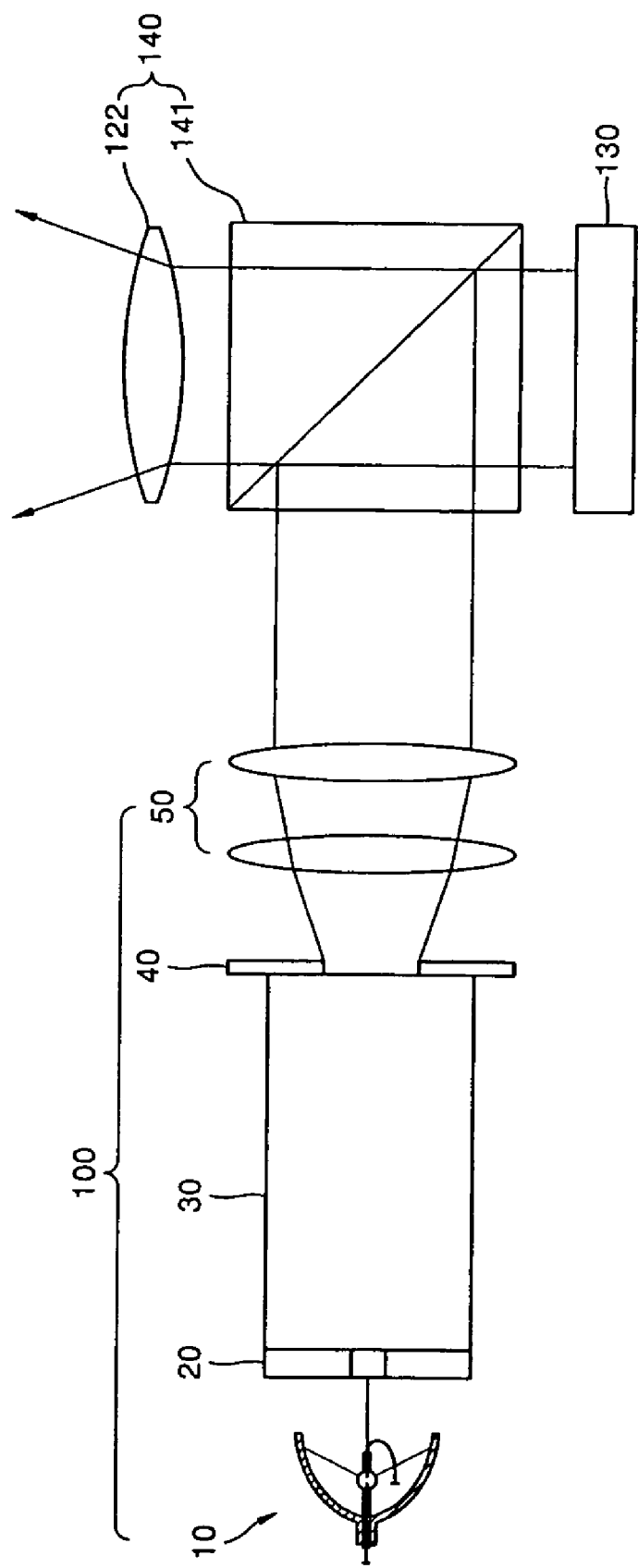
FIG. 6 illustrates a structure of a projection image display having the illumination unit according to another embodiment of the present invention.
Figure 7:
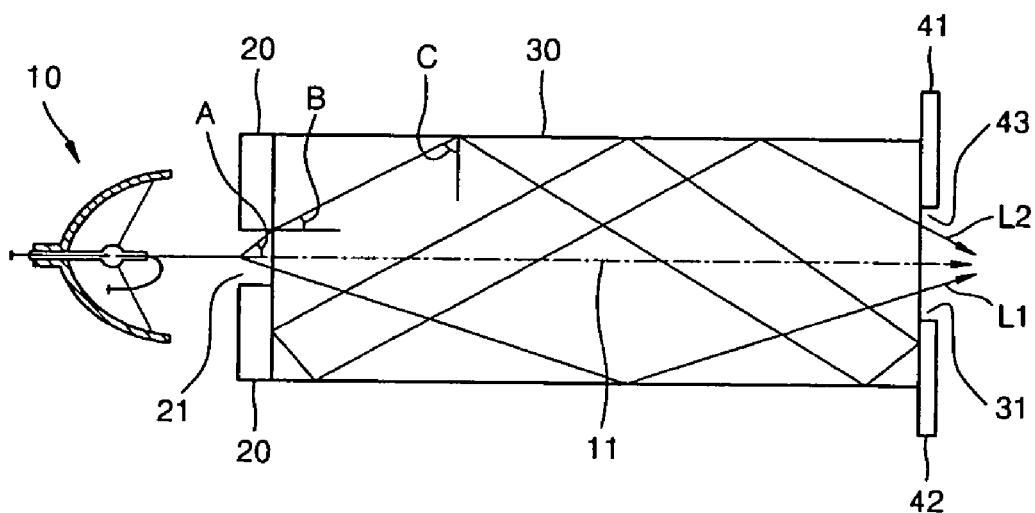
FIG. 7 illustrates the illumination unit of FIG. 2 according to the present invention.

FIG. 6 illustrates a structure of a projection image display having the illumination unit according to another embodiment of the present invention. The projection image display in FIG. 6 is a projection image display having a reflection optical modulator.

The projection image display comprises a digital mircromirror device (DMD) 130, which is a reflection optical modulator, an illumination unit 100, which illuminates the DMD 130, and a projection optical system 140, which enlarges and projects light modulated by the DMD 130. The projection image display according to the present embodiment sequentially converts a red image signal, a green image signal, and a blue image signal using one DMD 130. Preferably, but not necessarily, a lamp which radiates white light is used as the light source 10 of the illumination unit 100, and a color wheel (not shown) through which red light, green light, and blue light pass sequentially is installed between the light source 10 and the integrator 30. The projection optical system comprises a total internal reflection (TIR) prism 141, which reflects light emitted from the illumination unit 100 to the DMD 130 and transmits light modulated by the DMD 130 to a projection lens 121.

Hereinafter, an illustrative non-limiting operation of the illumination unit according to the present embodiment will be described with reference to FIGS. 2 through 7.

Light emitted from the light source 10 is transmitted to the integrator 30 through the light window 21. When a glass rod is used as the integrator 30, the difference in the refractive index between external media (air and glass) refracts the light when it enters the integrator 30. In this case, an azimuth angle of the light is reduced. Assuming that the refractive index of glass is about 1.5 and the refractive index of the air is about 1, if light emitted from the light source 10 has an azimuth angle A of about 0–90 degrees with respect to an optical axis 11, then the light entering the integrator 30 has an azimuth angle B of about 0–42 degrees with respect to the optical axis 11. The surface of the integrator 30 is a boundary surface with the air, which is an external medium. A critical angle at which total reflection occurs on the surface of the integrator 30 may be calculated from the refractive indices of glass and the air and is about 42 degrees. If an incident angle C of light on the surface of the integrator 30 is larger than the critical angle, light is not transmitted to the outside and is totally reflected. Because the azimuth angle B of light incident on the integrator 30 is about 0–42 degrees, the incident angle C of light on the surface of the integrator 30 is about 42–90 degrees. Thus, light incident on the integrator 30 is repeatedly totally reflected inside the integrator 30 and progresses onto the cross-section 31. When the light tunnel 60 of FIG. 3 is used as the integrator 30, light emitted from the light source 10 is repeatedly totally reflected inside the integrator 30 and progresses onto the cross-section 31. In this case, light is uniformly mixed inside the integrator 30, and light emitted from the integrator 30 has a uniform optical intensity distribution.

A controller (not shown) recognizes the aspect ratio of image information, moves the pair of reflective mirrors 41 and 42 using the driving unit of FIG. 4, and shields part of the cross-section 31 of the integrator 30. Thus, a slit 43 having the same aspect ratio as image information is formed on the cross-section 31. Light L1 is emitted from the light source 10, is reflected once inside the integrator 30, and is then emitted through the slit 43 formed by the pair of reflective mirrors 41 and 42. Thus, light passing through the slit 43 has substantially the same aspect ratio as image information.

Light L2 emitted from the light source 10, is reflected twice inside the integrator 30, and is then reflected by the reflective mirror 42 towards recycling member 20. The recycling member 20 is a reflective body and thus, reflects light L2 towards the cross-section 31. Light L2 passes through the slit 43 and is transmitted to the relay lens 50. Accordingly, in the illumination unit according to the present embodiment, light L2, which does not correspond to the aspect ratio of the image information, is recycled in the integrator 30 and converted to correspond to the aspect ratio of the image information. Thus, light flux passing through the slit 43 can be increased.

Light having substantially the same aspect ratio as image information passes through the relay lens 50, is transmitted to the optical modulators 110 or (130 of FIG. 6), and is enlarged and projected on a screen (not shown) through optical modulation.

Figure 1A:
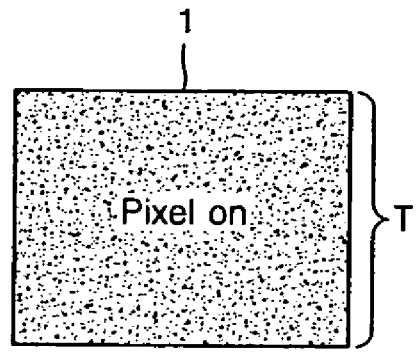
FIGS. 1A–1C illustrate conventional methods of adjusting an aspect ratio.
Figure 8:
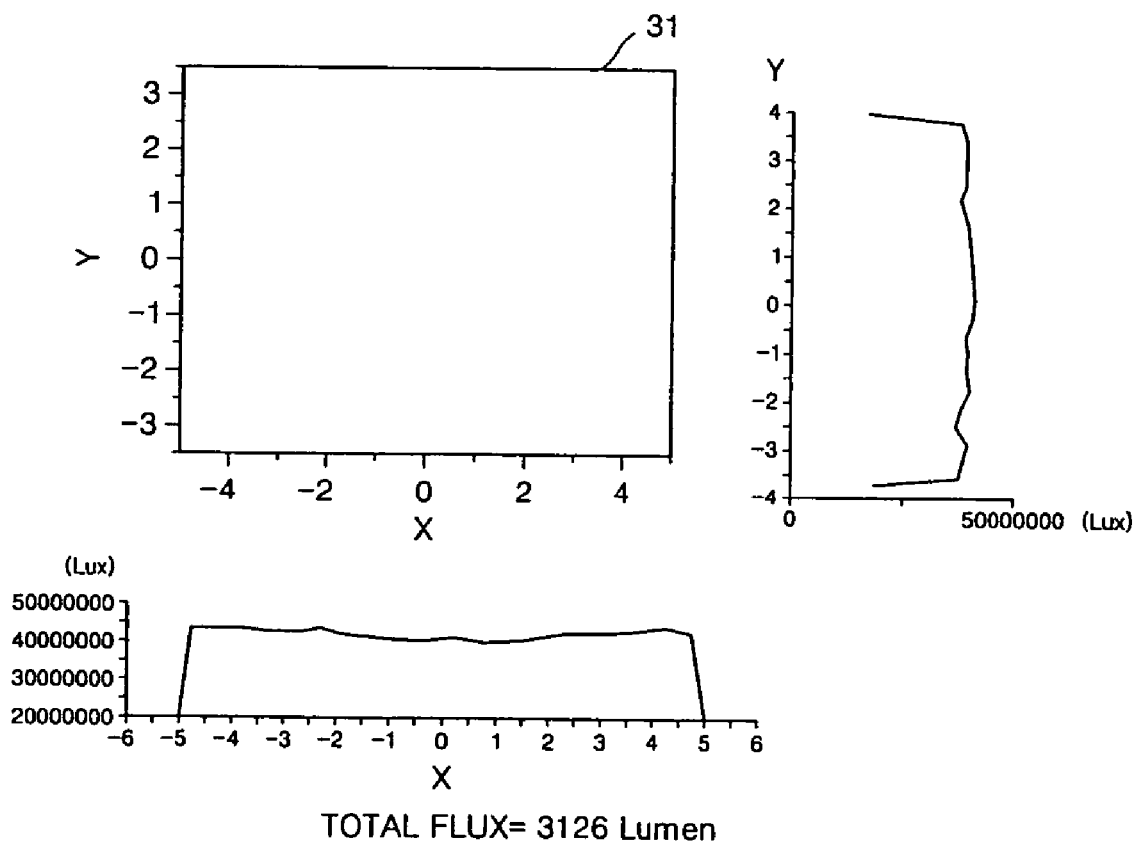
FIG. 8 is a graph of the optical intensity distribution of a cross-section of the integrator on which light is emitted.
Figure 9:
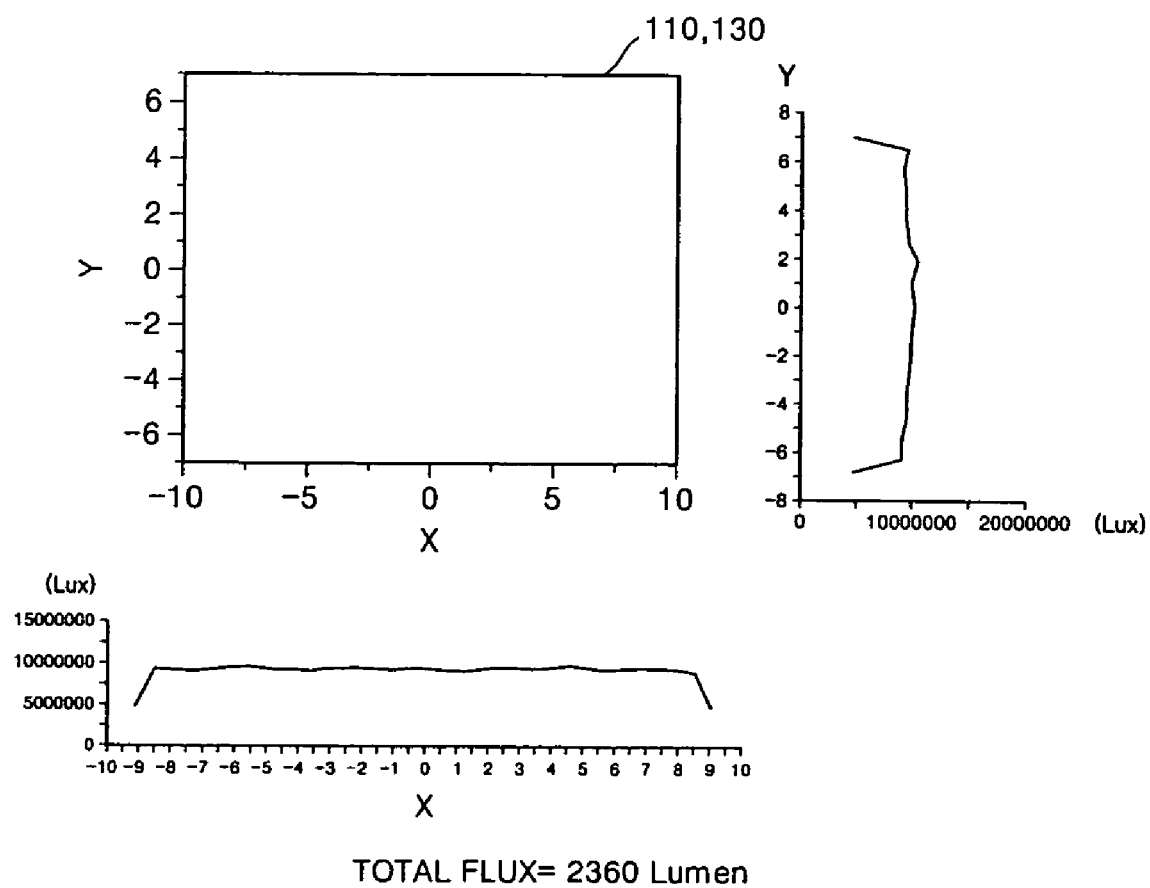
FIG. 9 is a graph of the optical intensity distribution of light condensed on an optical modulator when the optical modulator has the aspect ratio of 4:3.

Accordingly, the improvement of optical efficiency can be achieved during recycling. FIG. 8 is a graph of the optical intensity distribution of the cross-section 31 of the integrator 30. Referring to FIG. 8, the cross-section 31 of the integrator 30 has uniform optical intensity. In this case, the measured value of the total flux is about 3,126 Lumen. FIG. 9 is a graph of the optical intensity distribution of light condensed on an optical modulator when the optical modulator has an aspect ratio of 4:3. In this case, the total flux condensed on the optical modulator is about 2,360 Lumen. If the aspect ratio of a cross-section perpendicular to a progressive direction of light of the integrator 30 is 4:3, then FIG. 9 may represent a case where the slit member 40 and the recycling member 20 are not used. Thus, FIG. 9 represents the conventional method of adjusting an aspect ratio of FIG. 1A for the case where the aspect ratio is 4:3.

Figure 1B:
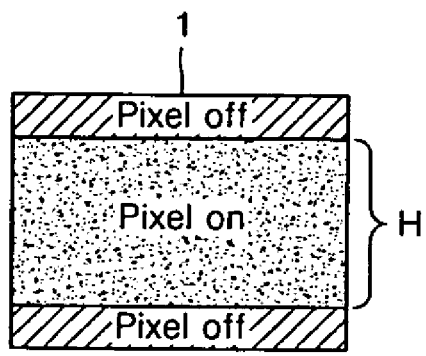
Figure 1C:
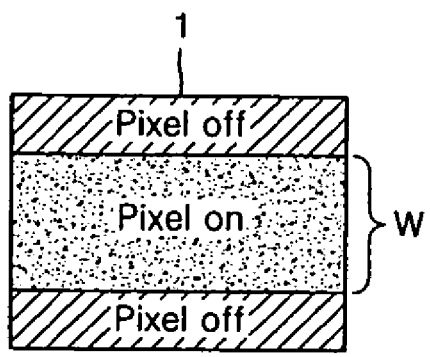
Figure 10:
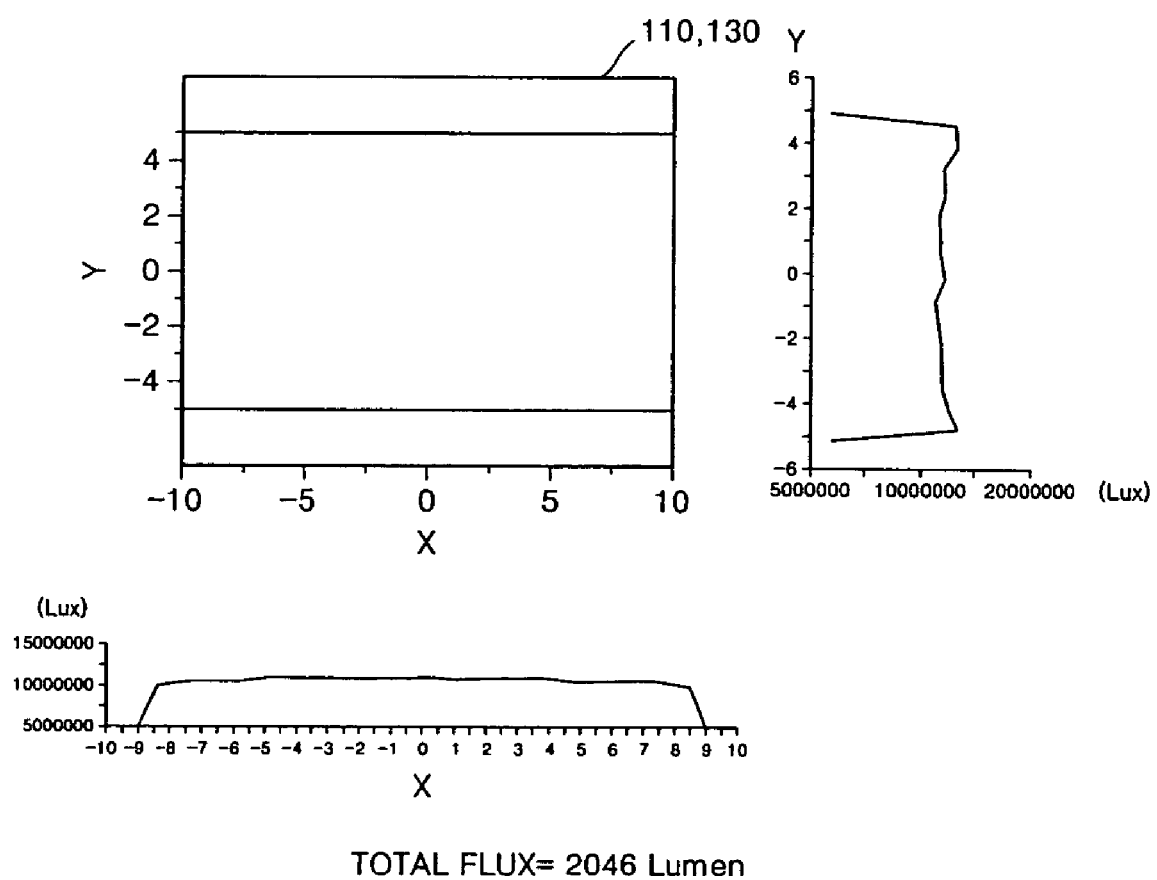
FIGS. 10 and 11 are graphs of the optical intensity distribution of light condensed on the optical modulator using the illumination unit of FIG. 2, where the slit member is adjusted so that the slit has the aspect ratio of 16:9 and 2.35:1, respectively.
Figure 11:
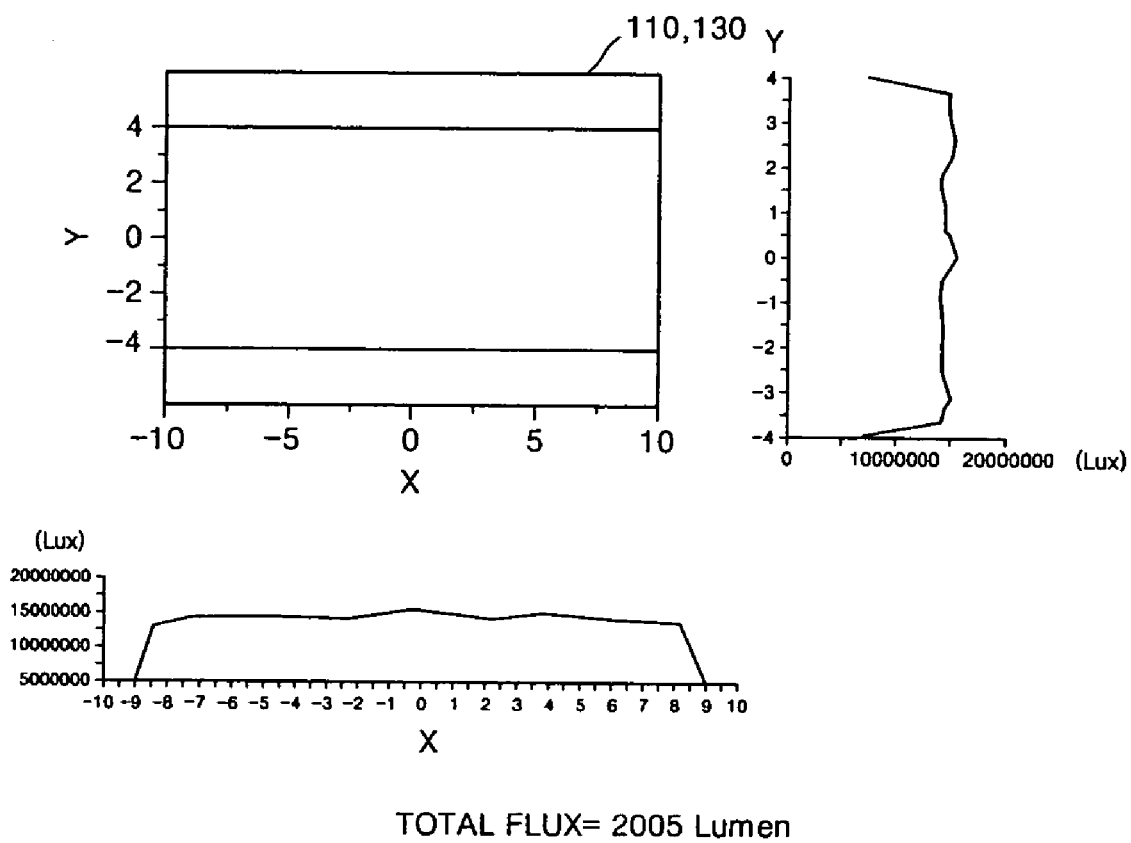
Figure 12:
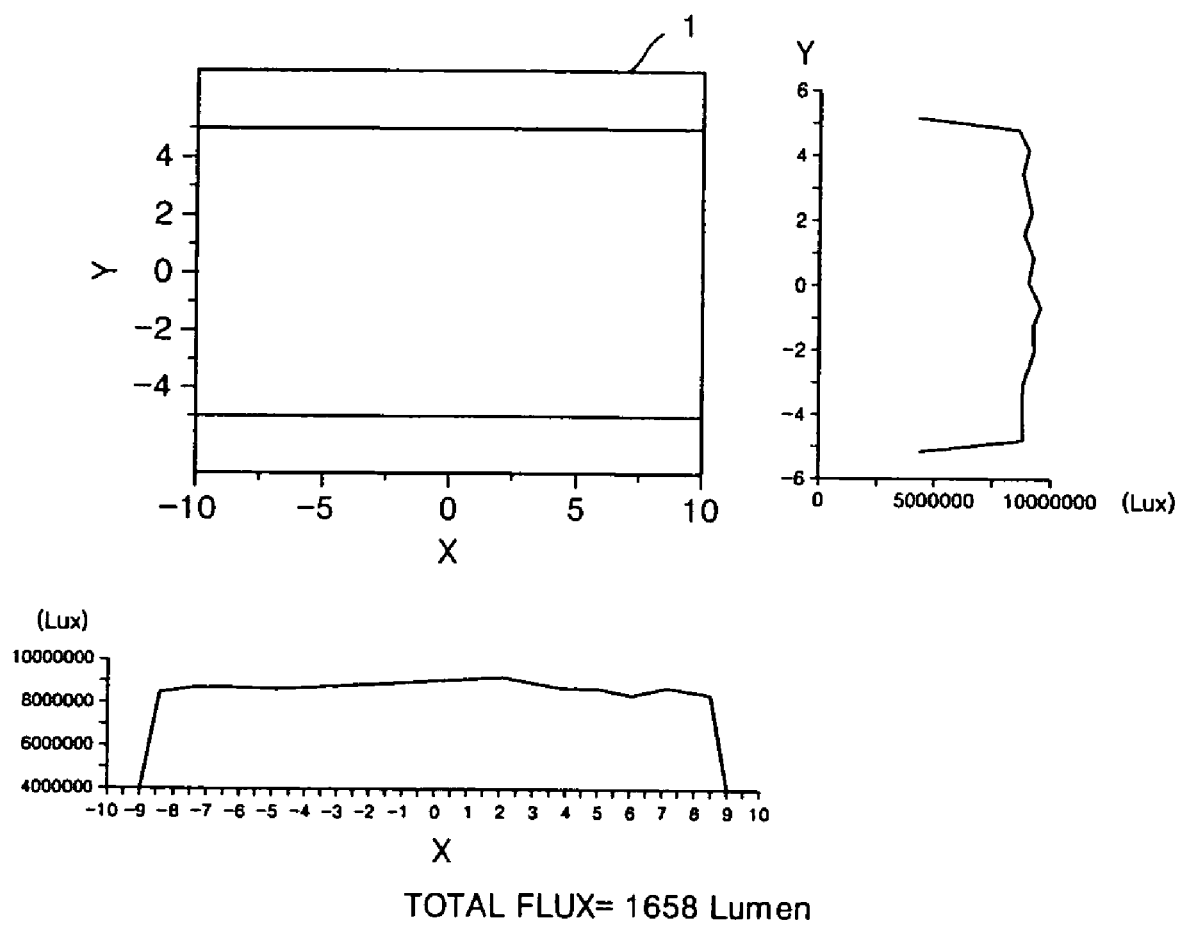
FIGS. 12 and 13 are graphs of the optical intensity distribution of light condensed on the optical modulator when pixels of the optical modulator are turned 'off' to achieve an aspect ratio of 16:9 and 2.35:1, respectively, using the conventional method of adjusting an aspect ratio of FIG. 1.
Figure 13:
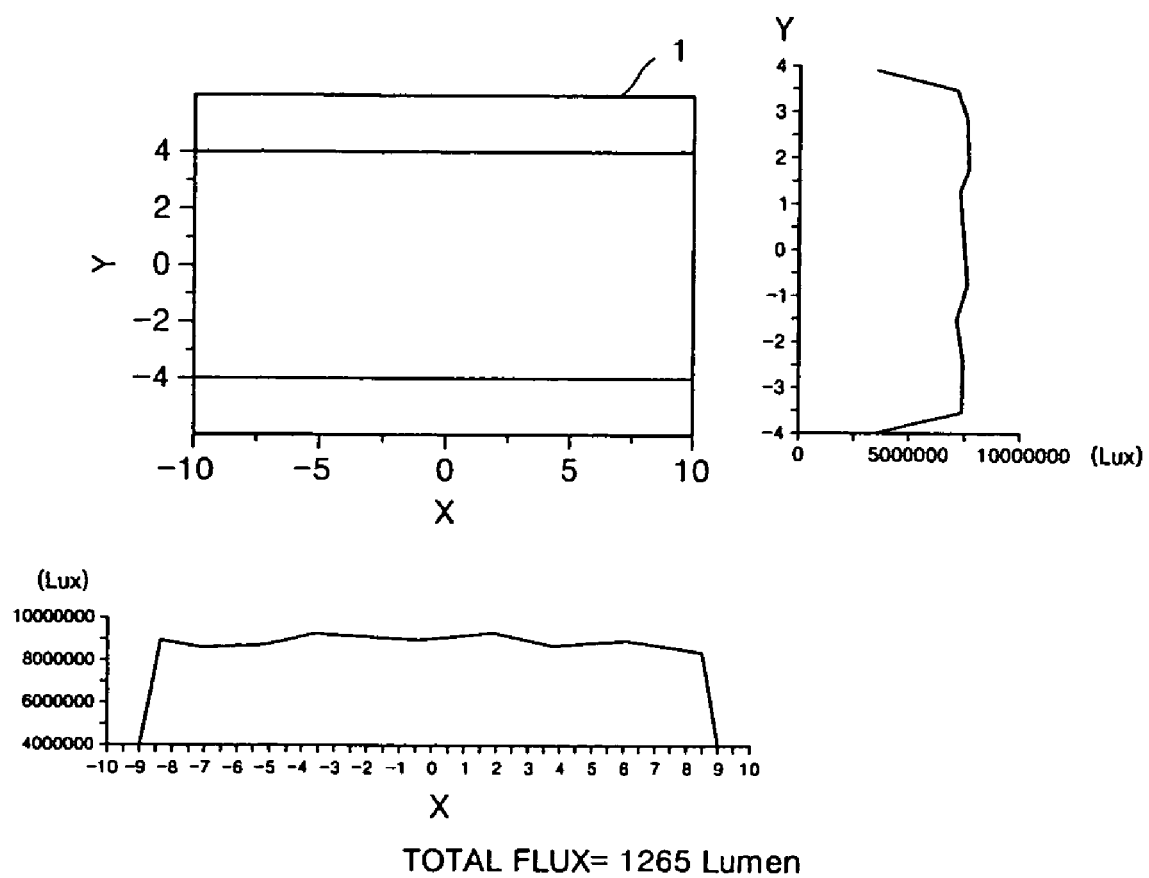

FIGS. 10 and 11 are graphs of the optical intensity distribution of light condensed on the optical modulator using the illumination unit of FIG. 2, where the slit member 40 is adjusted so that the slit has the aspect ratio of 16:9 and 2.35:1, respectively. FIGS. 12 and 13 are graphs of the optical intensity distribution of light condensed on the optical modulator when pixels of the optical modulator are turned 'off' to achieve an aspect ratio of 16:9 and 2.35:1, respectively, using the conventional method of adjusting an aspect ratio of FIGS. 1B and 1C. Referring to FIGS. 9 through 13, the intensity distribution of light condensed on the optical modulator is approximately the same in all cases. However, when comparing FIG. 10 with FIG. 12, total flux reaching the optical modulator is approximately 2,046 Lumen in FIG. 10 verses 1,658 Lumen in FIG. 12. Therefore, when the illumination unit 100 is used (FIG. 10), a larger quantity of light reaches the optical modulator. Thus, optical efficiency with respect to the total flux on the cross-section 31 of the integrator 30 is about 65% in FIG. 10 and 53% in FIG. 12, an increase of approximately 12% when the illumination unit 100 is used. Similarly, when comparing FIG. 11 with FIG. 13, the total flux reaching the optical modulators is approximately 2,005 and 1,265 Lumen, respectively. Optical efficiency with respect to the total flux on the cross-section 31 of the integrator 30 is about 64% in FIG. 11 and 40% in FIG. 13, an increase of approximately 24% when the illumination unit 100 is used.

As described above, in the illumination unit for the projection image display and the projection image display having the illumination unit consistent with the present invention, light, which does not correspond to the aspect ratio of image information, is recycled such that, even when an image is projected at a variety of aspect ratios, a good optical efficiency is obtained.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An illumination unit for a projection image display, the illumination unit comprising:
   a light source;
   an integrator, which converts light emitted from the light source to have uniform optical intensity; and
   an aspect ratio conversion unit, which transmits light emitted from the integrator that does not correspond to an aspect ratio of image information back to the integrator, and converts and emits incident light to correspond to the aspect ratio of the image information,
   said aspect ratio conversion unit comprising means for adjusting an aspect ratio of a cross-section of the integrator from which light is emitted according to the aspect ratio of the image information, and for reflecting the light, which does not correspond to the aspect ratio of the image information, back to the integrator.

2. The illumination unit of claim 1, wherein said aspect ratio conversion unit further comprises:
a slit member which is installed on a side of the integrator from which light is emitted, which adjusts an aspect ratio of a cross-section of the integrator from which light is emitted according to the aspect ratio of the image information, and which reflects the light, which does not correspond to the aspect ratio of the image information, back to the integrator;
a recycling member which is provided on a side of the integrator on which light is incident, which is a reflective body which reflects the light that has been reflected back to the integrator from the slit member, and in which a light window is formed so that light emitted from the light source is incident on the integrator; and
a driving unit which drives the slit member.

3. The illumination unit of claim 2, wherein the slit member includes a reflective mirror installed to be movable in at least one direction of a widthwise direction and a lengthwise direction of the cross-section.

4. An illumination unit for a projection image display, the illumination unit comprising:
a light source;
an integrator, which converts light emitted from the light source to have uniform optical intensity; and
an aspect ratio conversion unit, which transmits light emitted from the integrator that does not correspond to an aspect ratio of image information back to the integrator, and converts and emits incident light to correspond to the aspect ratio of the image information,
wherein the aspect ratio conversion unit comprises: a slit member which is installed on a side of the integrator from which light is emitted, which adjusts an aspect ratio of a cross-section of the integrator from which light is emitted according to the aspect ratio of the image information, and which reflects the light, which does not correspond to the aspect ratio of the image information, back to the integrator;
a recycling member, which is provided on a side of the integrator on which light is incident and is a reflective body which reflects light that has been reflected back to the integrator from the slit member, and in which a light window is formed so that light emitted from the light source is incident on the integrator; and
a driving unit which drives the slit member.

5. The illumination unit of claim 4, wherein the slit member includes a reflective mirror installed to be movable in at least one direction of a widthwise direction and a lengthwise direction of the cross-section.

6. The illumination unit of claim 4, wherein the slit member includes a pair of reflective mirrors installed to be adjacent or spaced apart from each other in at least one direction of a widthwise direction and a lengthwise direction of the cross-section.

7. The illumination unit of claim 4, wherein the integrator is a transparent rod formed of a transparent material.

8. The illumination unit of claim 4, wherein the integrator is a hollow-shaped light tunnel having internal reflective surfaces.

9. A projection image display comprising an illumination unit, an optical modulator which modulates light emitted from the illumination unit according to image data, and a projection optical system which enlarges and projects light emitted from the optical modulator, wherein the illumination unit comprises:
a light source;
an integrator, which converts light emitted from the light source to have uniform optical intensity; and
an aspect ratio conversion unit, which transmits light emitted from the integrator that does not correspond to an aspect ratio of image information back to the integrator, and converts and emits incident light to correspond to the aspect ratio of the image information,
said aspect ratio conversion unit comprising means for adjusting an aspect ratio of a cross-section of the integrator from which light is emitted according to the aspect ratio of the image information, and for reflecting the light, which does not correspond to the aspect ratio of the image information, back to the integrator.

10. The projection image display of claim 9, wherein said aspect ratio conversion unit further comprises:
a slit member which is installed on a side of the integrator from which light is emitted, which adjusts an aspect ratio of a cross-section of the integrator from which light is emitted according to the aspect ratio of the image information, and which reflects the light, which does not correspond to the aspect ratio of the image information, back to the integrator;
a recycling member which is provided on a side of the integrator on which light is incident, which is a reflective body which reflects the light that has been reflected back to the integrator from the slit member, and in which a light window is formed so that light emitted from the light source is incident on the integrator; and
a driving unit which drives the slit member.

11. The projection image display of claim 10, wherein the slit member includes a reflective mirror installed to be movable in at least one direction of a widthwise direction and a lengthwise direction of the cross-section.

12. A projection image display comprising an illumination unit, an optical modulator which modulates light emitted from the illumination unit according to image data, and a projection optical system which enlarges and projects light emitted from the optical modulator, wherein the illumination unit comprises:
a light source;
an integrator, which converts light emitted from the light source to have uniform optical intensity; and
an aspect ratio conversion unit, which transmits light emitted from the integrator that does not correspond to an aspect ratio of image information back to the integrator, and converts and emits incident light to correspond to the aspect ratio of the image information,
wherein the aspect ratio conversion unit comprises:
a slit member which is installed on a side of the integrator from which light is emitted, which adjusts an aspect ratio of a cross-section of the integrator from which light is emitted according to the aspect ratio of the image information, and which reflects light, which does not correspond to the aspect ratio of the image information, back to the integrator;
a recycling member, which is provided on a side of the integrator on which light is incident, is a reflective body which reflects light that has been incident back on the integrator using the slit member, and in which a light window is formed so that light emitted from the light source is incident on the integrator; and
a driving unit which drives the slit member.

13. The projection image display of claim 12, wherein the slit member includes a reflective mirror installed to be movable in at least one direction of a widthwise direction and a lengthwise direction of the cross-section.

14. The projection image display of claim 12, wherein the slit member includes a pair of reflective mirrors installed to be adjacent or spaced apart from each other in at least one direction of a widthwise direction and a lengthwise direction of the cross-section.

15. The projection image display of claim 12, wherein the integrator is a transparent rod formed of a transparent material.

16. The projection image display of claim 12, wherein the integrator is a hollow-shaped light tunnel having internal reflective surfaces.

17. The projection image display of claim 12, wherein the optical modulator comprises at least one of a reflection type optical modulator.

18. The projection image display of claim 12, wherein the optical modulator comprises at least one of a transmission type optical modulator.

* * * * *